G. W. BLODGETT.
COOKING UTENSIL.
APPLICATION FILED FEB. 20, 1913.

1,086,986.

Patented Feb. 10, 1914.

WITNESSES
Edw. Thorpe.
B. Joffe

INVENTOR
George W. Blodgett
BY
ATTORNEYS

UNITED STATES PATENT OFFICE.

GEORGE WARREN BLODGETT, OF PORTLAND, OREGON.

COOKING UTENSIL.

1,086,986.  Specification of Letters Patent.  Patented Feb. 10, 1914.

Application filed February 20, 1913. Serial No. 749,611.

*To all whom it may concern:*

Be it known that I, GEORGE W. BLODGETT, a citizen of the United States, and a resident of Portland, in the county of Multnomah and State of Oregon, have invented a new and Improved Cooking Utensil, of which the following is a full, clear, and exact description.

This invention relates to cooking utensils of known type, and the object is to provide a cover for this type of vessel which will prevent cooking without liquid in the vessel, and also condense the vapors formed during cooking and return the same to the vessel. This is obtained by providing a cover formed of a series of superposed members having a large condensing surface.

Reference is to be had to the accompanying drawings forming a part of this specification, in which like characters of reference indicate corresponding parts in both views, and in which—

Figure 1:
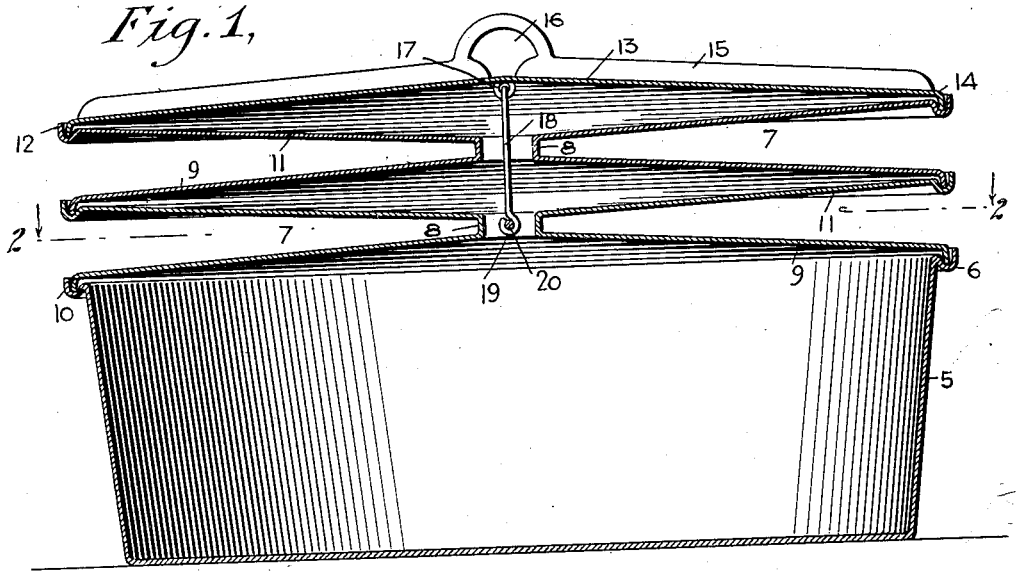
Figure 2:
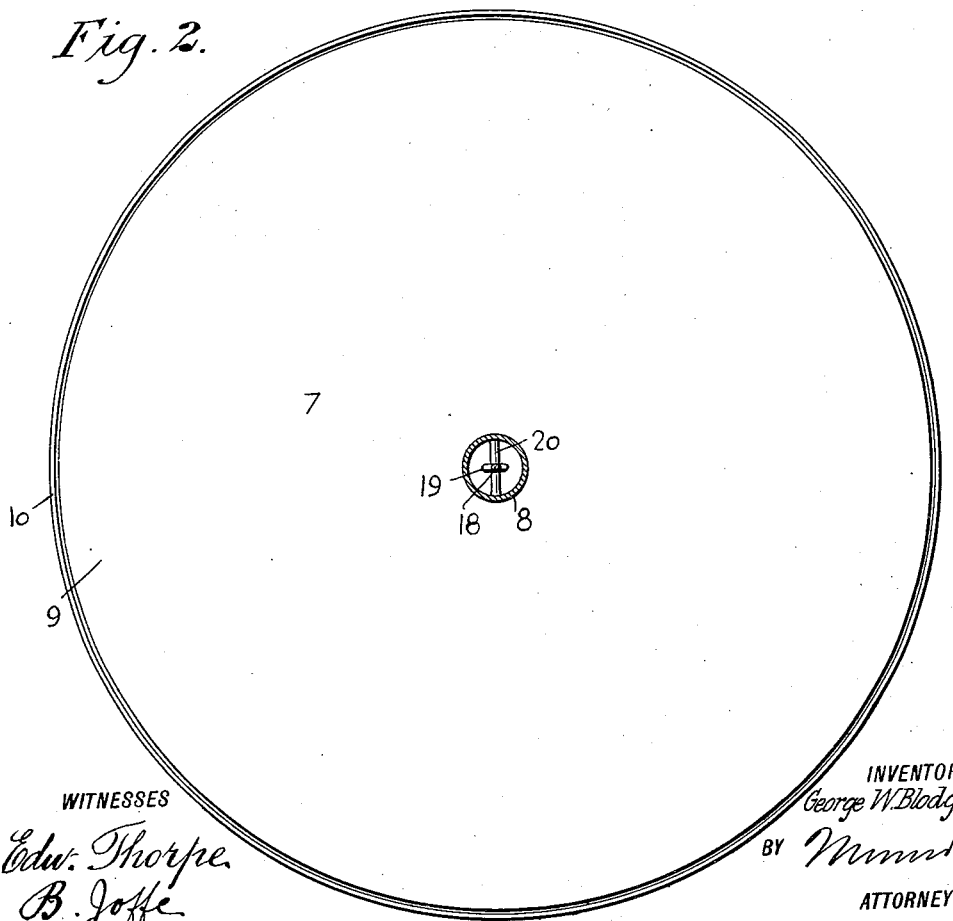

Figure 1 is an elevated section of an embodiment of my invention; while Fig. 2 is a horizontal section on the line 2—2 of Fig. 1.

Referring to the drawings, 5 represents a vessel as generally used, with the upper edge formed into a horizontal groove 6, preferably disposed toward the exterior lateral surface of the vessel. The groove 6 is preferably slightly depressed below the edge of the vessel 5 with the outer edge of the groove projecting slightly above the inner edge of the groove.

Covering the vessel 5 is a plurality of members 7, each formed of two cones converging toward each other at their vertexes, and interconnected by an axial tubular portion 8. The lower cone 9 has its edge 10 drawn preferably to a substantially vertical direction and engages the groove 6. The upper cone 11 has a groove 12 formed at its edge, the groove 12 being similar to the groove 6 formed on the vessel 5. Engaging the upper member 7 is a cover 13, preferably cone-shaped, having its edge 14 drawn into a substantially vertical position and engaging the groove 12 of the upper member 7. The cover 13 is preferably provided with a ridge 15 which strengthens the cover, and it is also provided with an eye 16 forming a handle for the cover. The cover 13, in its inner portion and substantially in the axis, is provided with an eye 17 which carries a rod 18 extending axially as far as the tubular portion 8 of the lowermost member 7. The rod 18 is, at its lower end, provided with an eye 19 into which fits a pin 20 extending through the tubular portion 8 of the lower member 7, thereby binding the cover 13 with the members 7 so that they all constitute a unit and can be removed from the vessel at the same time. It can be readily seen that with a construction like that shown the surface which may be increased by the addition of suitable corrugations or cooling vanes exposed by the members 7 is very large, and when vapors are formed in the vessel they will be condensed when contacting with the surfaces 9—11 of the members 7, and a certain amount of condensed vapors will accumulate in the grooves 10—12, thereby forming a seal. As previously stated, the inner edge of the grooves 10 and 12 being lower than the outer of same, the excess of condensed vapors will flow on the sides of the surface 11 and back into the vessel.

It is understood that any number of members 7 can be inserted between the cover 13 and the vessel 5. Due to the form of the seal in the grooves 10—12 the vapors cannot escape, and, consequently, there is no fear of complete evaporation. The cover can be taken apart for cleaning by forcing out the pin 20.

Having thus described my invention, what I claim as new and desire to secure by Letters Patent is:—

1. In a cooking utensil, an open vessel having a groove at the top thereof, a member formed of two open cones converging toward each other at their vertexes and having an axial tubular connection, one of said cones having its edge drawn to a substantially vertical direction and adapted to engage said groove of said vessel, the other of said cones having a groove at the top thereof, a cover having its edge drawn to a substantially vertical position normally engaging the groove in said member, and means for binding said cover and said member together to form a unit.

2. In a cooking utensil, an open vessel having a horizontally disposed groove at the top thereof, a unit consisting of a member formed of two cones open at their bases and converging toward each other at their vertexes and having an axial tubular connection, one of the said cones having its edge drawn to a substantially vertical direction and adapted to engage the said groove of said vessel, the other of said cones having a horizontally disposed groove at the edge thereof, a cover having its edge drawn to a substantially vertical position and normally engaging the groove of said member, and means for binding said cover and said member together to form the said unit.

3. In a cooking utensil, an open vessel having a horizontally disposed groove at the top thereof exterior to said vessel, said groove having its outer edge above the inner edge, a unit consisting of two cones open at their bases and converging toward each other at their vertexes and having an axial tubular connection, one of said cones having its edge drawn to a substantially vertical direction and adapted to engage said groove of said vessel, the other of said cones having a horizontally disposed groove at the top thereof, said groove having its outer edge above the inner edge, a cover having its edge drawn to a substantially vertical direction normally engaging the groove in said member, and means for binding said cover and said member together to form the said unit.

In testimony whereof I have signed my name to this specification in the presence of two subscribing witnesses.

GEORGE WARREN BLODGETT.

Witnesses:
H. H. NEWHALL,
F. W. ALT, Jr.

---

Copies of this patent may be obtained for five cents each, by addressing the "Commissioner of Patents, Washington, D. C."